US012008276B2

(12) United States Patent
Rohde et al.

(10) Patent No.: US 12,008,276 B2
(45) Date of Patent: Jun. 11, 2024

(54) CLOUD PRINTING UTILIZING QUEUED MESSAGE SERVICE

(71) Applicant: City Storage Systems LLC, Los Angeles, CA (US)

(72) Inventors: Henning Korsholm Rohde, Seattle, WA (US); Thiraphat Charoensripongsa, Seattle, WA (US); William David Wasserstrum, Kirkland, WA (US)

(73) Assignee: City Storage Systems LLC, Los Angeles, CA (US)

( * ) Notice: Subject to any disclaimer, the term of this patent is extended or adjusted under 35 U.S.C. 154(b) by 0 days.

(21) Appl. No.: 18/226,467

(22) Filed: Jul. 26, 2023

(65) Prior Publication Data
US 2024/0036786 A1   Feb. 1, 2024

Related U.S. Application Data

(60) Provisional application No. 63/393,090, filed on Jul. 28, 2022.

(51) Int. Cl.
*G06F 3/12* (2006.01)
(52) U.S. Cl.
CPC .......... *G06F 3/1236* (2013.01); *G06F 3/1203* (2013.01); *G06F 3/1285* (2013.01)
(58) Field of Classification Search
CPC ..... G06F 3/1203; G06F 3/1236; G06F 3/1285
See application file for complete search history.

(56) References Cited

U.S. PATENT DOCUMENTS

| 10,333,774 | B2* | 6/2019 | Ito ....................... H04L 41/0883 |
| 10,693,952 | B2* | 6/2020 | Waltz ..................... G06F 16/27 |
| 11,201,930 | B2* | 12/2021 | Jain ........................ H04L 67/10 |
| 2012/0159246 | A1 | 6/2012 | Paramasivam et al. |
| 2023/0010417 | A1* | 1/2023 | Mishra .................... G06N 5/01 |
| 2023/0096403 | A1* | 3/2023 | Rohde ................. G06Q 10/087 |
| | | | 718/104 |

OTHER PUBLICATIONS

Thyagaraj et al, "IBM MQ as a Service: A Practical Approach", IBM Redbooks, Feb. 16, 2016. (Year: 2016).*
Yongguo et al, "Message-oriented Middleware: A Review", 2019 5th International Conference on Big Data Computing and Communications (BIGCOM) (pp. 88-97), pub. Aug. 1, 2019. (Year: 2019).*

(Continued)

*Primary Examiner* — Scott A Rogers
(74) *Attorney, Agent, or Firm* — Lerner David LLP

(57) ABSTRACT

The present disclosure describes a queued message service (QMS) that provides a multi-region, low-latency and reliable service for managing a large number of durable message queues for async targeted communication. This general-purpose, internal service QMS may be implemented in print queues as well as command queues for sensors. One example implementation of QMS is a print service. Such implementation introduces status indicators for printers internally, wherein such status indicators may identify whether a printer is blocked, offline, suspected of failure, properly functioning, etc.

18 Claims, 8 Drawing Sheets

(56) References Cited

OTHER PUBLICATIONS

Duggan ("Enterprise Software Architecture and Design: Entities, Services, and Resources", Wiley-IEEE Press 2012 (Edition: 1, Chapter: 2, Middleware), pub. Jan. 1, 2012. (Year: 2012).*
Patel Dharm:It et al: "Towards In-Order and Exactly-Once DeliVery Using Hierarchical Distributed Message Queues", 2014 14TH IEEE/ACM International Symposium on Cluster, Cloud and Grid Computing, IEEE, May 26, 2014 (May 26, 2014), pp. 883-892, XP032614434, DOI: 10.1109/CCGRID.2014.109 [retrieved on Jun. 30, 2014] the whole document.
International Search Report and Written Opinion Issued in Appln. No. PCT/US2023/028636 dated Nov. 8, 2023 (17 pages).

* cited by examiner

CLOUD PRINTING UTILIZING QUEUED MESSAGE SERVICE

CROSS-REFERENCE

The present application claims the benefit of the filing date of U.S. Provisional Application No. 63/393,090 filed Jul. 28, 2022, the disclosure of which is hereby incorporated by reference herein.

BACKGROUND

Cloud printing services must offer reliable and fast ticket printing at scale. Pull-based printers are reliable but resistant to fast printing. In pull-based printing, each request reaches a different server node at a set frequency, such as every 5 seconds. Further, in responding to the request, a database is consulted, resulting in a high input/output (I/O) load. This setup scales poorly and the I/O load and connection overhead prevents simply increasing the frequency for faster printing. It can also be difficult to determine when a pull-based printer is offline and when it is only transiently connected. Printers generally have quirks and failed jobs that should impact the overall view of the printer's health, but in practice the printer can fail to print every job and still consider itself healthy.

Push-based printers in contrast are permanently connected, typically through an intermediary message queuing telemetry transport (MQTT) broker, but are less reliable due to poorer control to overcome printer quirks and network issues. Existing cloud printing services effectively offload error handling to the printer, with mixed results. Some printers cannot handle more than 1 job at a time without error, but it is difficult for servers to make that guarantee while still printing quickly. In particular, the service cannot tell the difference between a slow printer and a dropped job message, and therefore cannot determine whether to resend a print job or not.

BRIEF SUMMARY

The present disclosure describes a queued message service (QMS) that provides a multi-region, low-latency and reliable service for managing a large number of durable message queues for async targeted communication. This general-purpose, internal service QMS may be implemented in print queues as well as command queues for sensors.

One example implementation of QMS as described herein is a print service which uses QMS in-memory exclusivity semantics to make reconnection graceful, because it allows detecting and closing the previous, seemingly-active-but-actually-stale connection quickly. It also uses the lease state to detect when a predetermined threshold of time has passed since a printer last connected/polled for a job. Such implementation also introduces status indicators for printers internally, wherein such status indicators may identify whether a printer is blocked, offline, suspected of failure, properly functioning, etc. All attempts to print and reasons for success/failure may be recorded. Service logic may be used to compute the status and use it as a basis for further operations. For example, jobs are not sent to a blocked printer, thereby providing more reliable printing as some printers silently discard jobs received in such a state. The print service marks a printer "suspected of failure" when it fails to print a job for any reason, which helps identify broken printers. This may also help to identify configurations, such as incorrect formatting, where the printer itself claims it is fine but something else is wrong. Such problems can be hard to detect otherwise.

One aspect of the disclosure provides a system, comprising memory and one or more processors in communication with the memory. The one or more processors may be configured to: assign, by a leader, a range of addresses of a database to each of a plurality of coordinators, wherein each coordinator manages communications with a subset of one or more peripheral devices connected to the system; receive, by a writer, an incoming message; enqueue, by the writer, the message in the database; and notify, by the writer based on an address of the enqueued message, one of the plurality of coordinators having the range of addresses that includes the address of the enqueued message.

In some implementations, the one or more processors may be further configured to: deliver, by a reader, the enqueued message to a recipient. The recipient may be, for example, a peripheral device. By way of example, the peripheral device may include at least one of a speaker, display, or printer.

In some implementations, the reader may be configured to: load a payload of the enqueued message from the database; and relay an acknowledgement to the one of the plurality of coordinators having the range of addresses that includes the address of the enqueued message.

In some implementations, the plurality of coordinators may be configured to maintain a status of each of a plurality of connected peripheral devices.

In some implementations, the leader may be further configured to distribute a load among the plurality of coordinators.

In some implementations, the plurality of coordinators may maintain queue message metadata and delivery progress of messages.

In some implementations, the memory may store a shard assignment table, the shard assignment table indicating a correlation between each of the plurality of coordinators and an assigned address range.

In some implementations, each of the plurality of coordinators may be configured to scan queues in the assigned address range of the database to check for newly committed messages.

Another aspect of the disclosure provides a method, comprising connecting a recipient device to a reader of a queued message service (QMS) node; receiving, at a writer of the QMS node, a message for the recipient device; writing, by the writer of the QMS node, a payload of the message to a database; notifying, by the writer, a coordinator of the QMS node that the message was written to the database; and based on a status of the recipient device, instructing, by the coordinator, the reader to deliver the message from the database to the recipient device. 12. According to some examples, the recipient device may be a printer and the message may be a print job. The method may further include relaying, by the reader, an acknowledgement to the coordinator.

In some examples, the method may further include determining, by the coordinator, a status of the recipient device based on a heartbeat from the recipient device; and maintaining, by the coordinator, the status of the recipient device.

In some examples, the method may further include maintaining, by the coordinator, queue message metadata and delivery progress of messages.

In some examples, the method may further include storing a shard assignment table, the shard assignment table indicating a correlation between the coordinator and an assigned address range in the database.

In some examples, the method may further include scanning, by the coordinator, queues in the assigned address range of the database to check for newly committed messages.

Yet another aspect of the disclosure provides a non-transitory computer-readable medium storing instructions executable by one or more processors for performing a method. Such method may include connecting a recipient device to a reader of a queued message service (QMS) node; receiving, at a writer of the QMS node, a message for the recipient device; writing, by the writer of the QMS node, a payload of the message to a database; notifying, by the writer, a coordinator of the QMS node that the message was written to the database; and based on a status of the recipient device, instructing, by the coordinator, the reader to deliver the message from the database to the recipient device.

DETAILED DESCRIPTION

The present disclosure provides a queued messaging service (QMS) offering multi-region, low-latency and reliable communication. One example implementation of the QMS is a cloud printing service.

Example Systems

Figure 1:
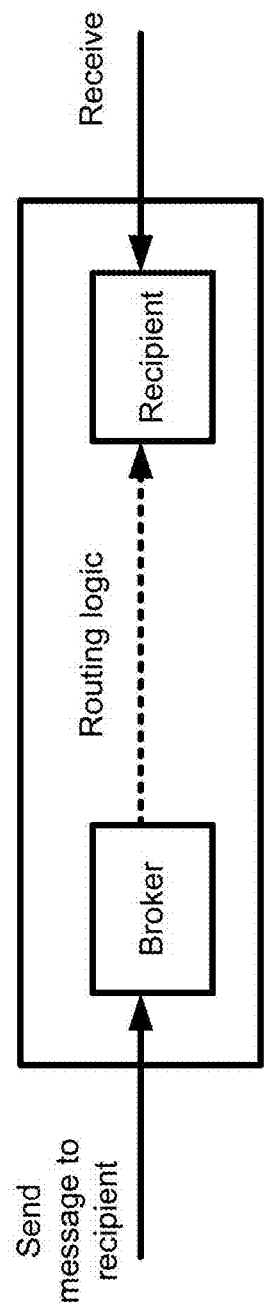
FIG. 1 a block diagram illustrating a simplified example architecture of QMS according to aspects of the disclosure.

FIG. 1 provides a simplified block diagram illustrating an example messaging system. Each message recipient has a permanent "address" to which any submitter can enqueue messages. Once accepted by the broker, messages are delivered at least once and in order to the recipient. The message broker is configured to handle multi-region communication, in addition to handling asynchrony exclusivity, and volatility. Regarding asynchrony, recipients are not necessarily connected all the time. Messages are accepted even if the recipient is not connected and delivered immediately when it does connect. Regarding exclusivity, recipients fail and reconnect, thus may briefly appear to be connected to multiple machines at the same time. Regarding volatility, recipients may connect briefly to a different machine for each message. The broker makes progress even with such volatile recipients.

QMS is a multi-region messaging service using a distributed database for durable messages and bookkeeping, and a key value store for leader election. Each "address" in QMS may be a unique identifier. As one example, each address may be a region/universally unique identifier (UUID) pair. For multi-tenancy, addresses exist in disjoint namespaces. Scalability may be achieved by sharding the region/UUID space, so that no single node needs to manage all addresses.

Figure 2:
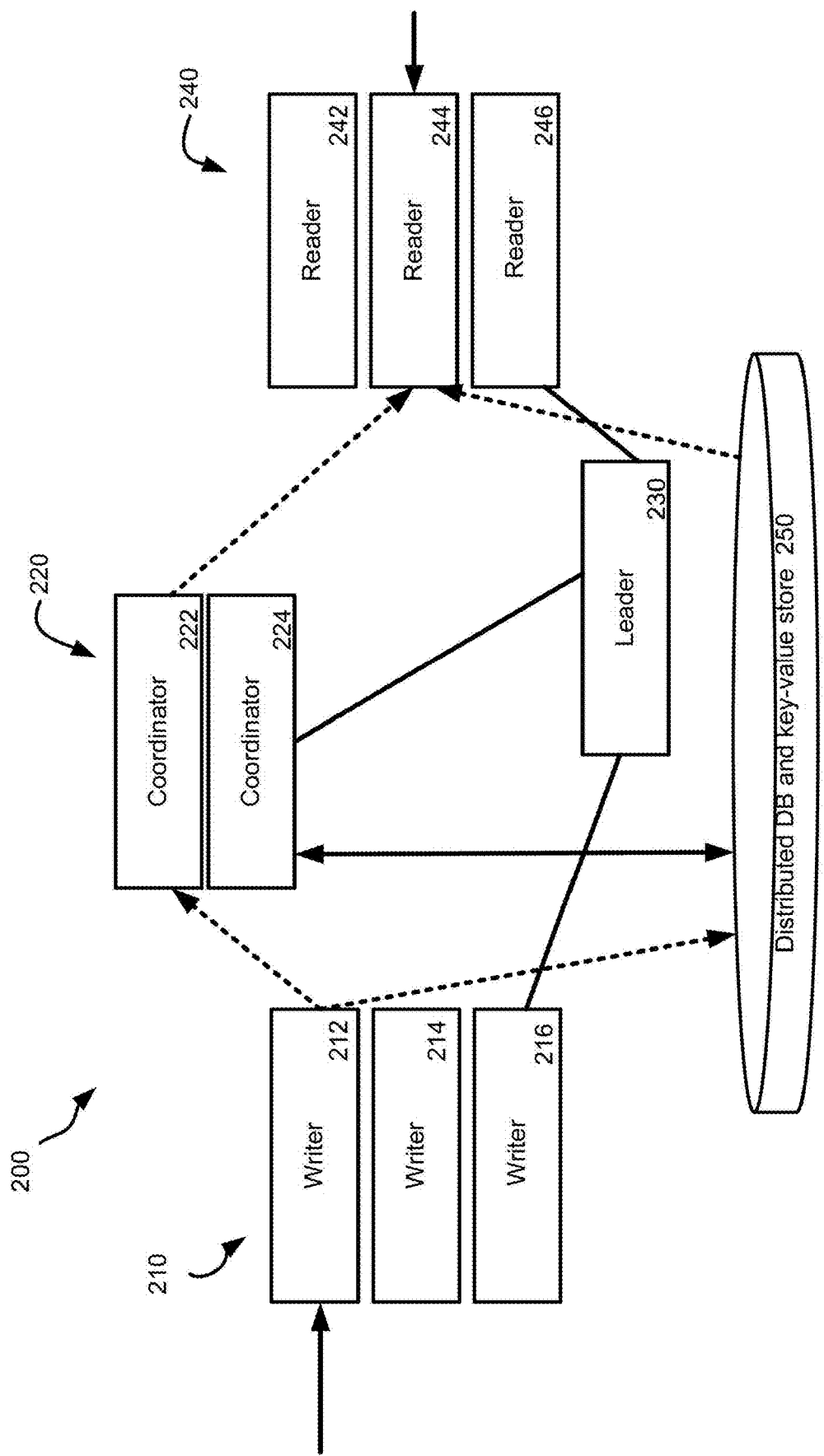
FIG. 2 is a block diagram illustrating another example architecture of QMS according to aspects of the disclosure.

FIG. 2 illustrates an example QMS architecture 200 of a QMS node, including a leader 230, one or more coordinators 220, one or more writers 210, one or more readers 240, and a distributed database 250. The leader 230, coordinators 220, writers 210, readers 240 may each be, for example, modules, threads, instructions, or the like stored in memory and executable by one or more processors. The QMS node may be used to communicate messages between a sender and a recipient. Multiple senders and recipients may communicate using the QMS node at any given time. By way of example only, the sender may be a server generating messages for a plurality of recipient devices at various remote locations. For example, the recipient devices may include printers, displays, speakers, or other types of peripheral devices located at different establishments.

The leader 230 may be dynamically chosen from among the nodes. For example, the leader 230 may be chosen based on availability, rotation, randomness, self-nomination confirmed by the nodes, or any other method of leader election. The leader 230 may be responsible for shard assignments and load distribution among all coordinators. The leader 230 may further be responsible for publishing a shard assignment table to facilitate direct communication between nodes and coordinators. For example, the shard assignment table may publish information for establishing a multiplexed bi-directional streaming connection, such as using remote procedure calls (RPCs), gRPC, HTTP, etc. The information may include, for example, address, routing, or other connection information for a specific coordinator 220.

Coordinators 220 may heartbeat with the leader 230 to renew the leader's ownership lease. If a leader crashes, a new leader takes over and collects existing assignments from coordinators. If a coordinator 222, 224 crashes, the leader 230 will re-assign the shard after its lease expires.

Each coordinator 222, 224 is responsible for a shard. Shards may be defined based on region, and may each include a range of addresses, such as UUIDs. Each recipient may be connected to a specific coordinator that is responsible for its address via a worker (not shown). According to some examples, a recipient may sub-lease ownership of an individual address from the coordinator. Similarly, the recipient may relinquish the individual address if it is to gracefully disconnect. Such sub-lease semantics may guarantee recipient exclusivity. Each writer 212, 214, 216 may also communicate with each coordinator 222, 224.

Each coordinator 222, 224 maintains queue message metadata and delivery progress in memory, backed durably by regionalized database tables. The database tables may include, for example, tables for messages, queues, cursors, etc. For example, a message may be stored in a table with (region, domain, key, seqno) as an index and a corresponding payload. Queues may be stored in a table with (region, domain, key) as the index and a corresponding seqno. The queues table may serve as an index of messages that can be practically scanned. Cursors may be stored in a table with (region, domain, key) as the index and a corresponding processed seqno.

The message payloads are not sent through the coordinators 220. The coordinator 222, 224 receives notifications about new messages directly, but also scans the queues table periodically in case a new message is committed, but no notification was sent, to ensure no message fails to be delivered. Each delivered message may be explicitly acknowledged by the recipient to confirm delivery before the next message is sent. Once the delivered message is acknowledged, the coordinator 222, 224 may advance the cursor.

The coordinator 222, 224 is naturally aware of recipient connection status, last connection time, etc. Based on such connection status, the coordinator 222, 224 can expose whether a recipient is "online" or "offline", message backlog, administrative operations for queue manipulation, etc.

In this example, the coordinator 222, 224 has complete control over address ownership as well as delivery semantics. This affords flexibility to accommodate a variety of QMS use cases. For example, the coordinator chooses how to assign the winner of an address claim. In some examples, a last connection wins, though other examples are possible. In some examples, multiple recipients can have the same address with a variety of delivery strategies, such as round robin, random, multi-cast, assigning messages a time-to-live, etc.

Writers 210 are responsible for enqueuing incoming messages. For example, when a writer 212, 214, 216 receives an incoming message, it commits the message with a next sequence number and, if successful, asynchronously sends a notification to the corresponding coordinator that is responsible for the shard including the message address. After it has been committed, the writer sends a notification to the coordinator that owns a message it enqueues. For example, a shard assignment table may be used to determine which coordinator is notified, based on an address of the enqueued message. For example, a message with key (region1, b) may be owned by an assignment of (region1, [a-d]). The shard assignment table includes information, such as IP address and identifier for the coordinator, indicating how to connect the writer to the coordinator. A writer may enqueue messages from any region. Concurrent writes may be serialized as a result of using database transactions. The message is accepted if the commit succeeds. If the coordinator is unreachable or down or if the node crashes post-commit, the coordinator's periodic sweep will eventually discover and deliver the message.

The reader 242, 244, 246 may be responsible for message delivery to locally-connected recipients. Recipients may include, for example, computing devices or peripheral devices, such as printers, displays, speakers, etc. According to some examples, a given recipient may have a corresponding reader 242, 244, 246, such that the recipient utilizes the given reader to retrieve messages. For example, a first computing device may correspond to reader 242, while a second computing device corresponds with reader 244. The first and second computing devices may have the same or different device type, protocol, region, etc.

When a recipient connects, the reader 242, 244, 246 will try to claim the address from the corresponding coordinator 222, 224, which will thereafter push the next message for delivery, when available. If the address is already claimed, the coordinator will try to revoke the old claim and, once relinquished, give it to the new recipient. The old recipient will then be disconnected.

The message payload is loaded from database 250 by the reader. Acknowledgements are relayed to the coordinator 222, 224. If a recipient loses its address claim, it is disconnected. If a reader 242, 244, 246 crashes, it will lose its subleases as it fails to renew them. As a practical convenience, the reader allows recipient multiplexing over the same connection established with the coordinator.

According to some examples, a system may include multiple QMS nodes, wherein each QMS has the architecture 200 described above. The system may be scaled by creating additional instances. QMS may also offer transactional enqueue, so that services can submit one or more QMS and keyed event queue (KEQ) messages in a database transaction along with a state of the services.

While the example above illustrates a particular number of writers, readers, coordinators, and other components, it should be understood that this is merely one example. Other examples may include various numbers of each type of component. Moreover, the number of each component need not correspond to the number of any other component. By way of example, a system may include more writers than readers, more readers than writers, etc.

Figure 3:
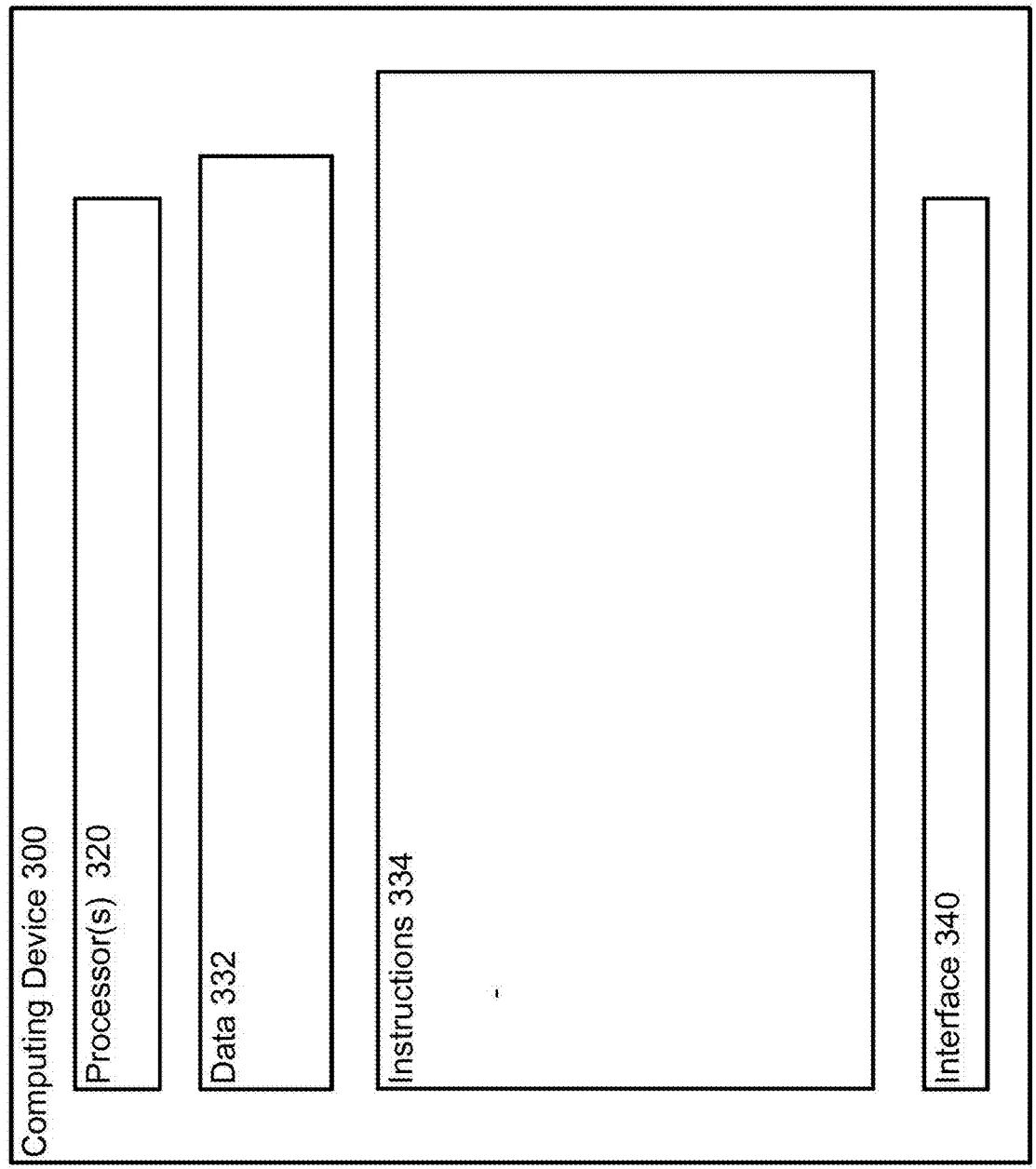
FIG. 3 is a block diagram illustrating an example computing device for QMS according to aspects of the disclosure.

FIG. 3 illustrates an example computing device 300, which may be configured to perform QMS processing as described above. The computing device 300 includes one or more processors 320, memory 330 and other components typically present in computing devices. Memory 330 can store information accessible by the one or more processors 320, including instructions 334 that can be executed by the one or more processors 320.

Memory 330 can also include data 332 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 334 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 332 may be retrieved, stored or modified by the one or more processors 320 in accordance with the instructions 334. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 320 can be any conventional processors, such as a commercially available CPU. Alternatively, the processors can be dedicated components such as an application specific integrated circuit ("ASIC") or other hardware-based processor. Although not necessary, one or more of computing devices 300 may include specialized hardware components to perform specific computing processes.

The computing device 300 may include a communication interface 340 enabling communication between the device 300 and other components, such as a distributed database, key-value store, consumer systems, etc. The computing device may communicate over a network and with other devices using various protocols and systems, such that the network can be part of the Internet, World Wide Web, specific intranets, wide area networks, or local networks. The network can utilize standard communications protocols, such as Ethernet, WiFi, HTTP, protocols described in IEEE 302.33, cellular technology (such as GSM, CDMA, UMTS, EV-DO, WiMAX, LTE, etc.) protocols that are proprietary to one or more companies, and various combinations of the foregoing. Although certain advantages are obtained when information is transmitted or received as noted above, other aspects of the subject matter described herein are not limited to any particular manner of transmission of information.

Although FIG. 3 functionally illustrates the processor, memory, and other elements as being within the same block, the processor, computer, computing device, or memory can actually comprise multiple processors, computers, computing devices, or memories that may or may not be stored within the same physical housing. Accordingly, references to a processor, computer, computing device, or memory will be understood to include references to a collection of processors, computers, computing devices, or memories that may or may not operate in parallel. Yet further, although some functions described below are indicated as taking place on a single computing device having a single processor, various aspects of the subject matter described herein can be implemented by a plurality of computing devices, for example, in the cloud. Similarly, memory components at different locations may store different portions of instructions 334 and collectively form a medium for storing the instructions. Various operations described herein as being performed by a computing device may be performed by a virtual machine. By way of example, instructions 334 may be specific to a first type of server, but the relevant operations may be performed by a second type of server running a hypervisor that emulates the first type of server. The operations may also be performed by a container, e.g., a computing environment that does not rely on an operating system tied to specific types of hardware.

Example Implementations

One example implementation of QMS is a cloud print service, wherein print jobs are sent from a first computing device at a first location to a printer at a second location remote from the first location. Such cloud print service could use QMS to represent print job queues, wherein each message is a print job. A payload of the message may include, for example, a print file or format, graphic, text, or other type of information for printing. QMS may also serve as notification mechanism for new print jobs for a long-polling printer. The cloud print service can translate a job queue name into a region/UUID address both for submitting and retrieving print jobs, thus using QMS. According to some examples, print operations may be used to enqueue the message to let it transactionally maintain some additional state.

A cloud print protocol may use different calls to process print jobs. Example calls may include POST, GET and DELETE. The cloud print service may record any inflight jobs in its own table to be able to send an acknowledgement to QMS when a GET call is issued. In other examples, the cloud print service may wait for the printer to call DELETE. The cloud print service may relinquish the QMS sub-lease after each acknowledgement to ensure it can grab it again immediately after the next DELETE. The cloud print service thereby avoids internal communication by maintaining a 1-print-job inflight buffer. Printer authentication may also be handled by the cloud print service.

The example cloud print service described herein can handle both push-based protocols, such as MQTT, and poll-based protocols. For reliability, the printer observability and garbage collection may be isolated in a separate flow, so that import-to-print is not impacted if an observability dependency fails. Code that does printing may be isolated from the code that reports how well printing is working and deleting old jobs. In this regard, if the latter code is not working or is slow, printing is still fast. A time between receipt of a print job and printing a ticket for it can still be fast.

Figure 4:
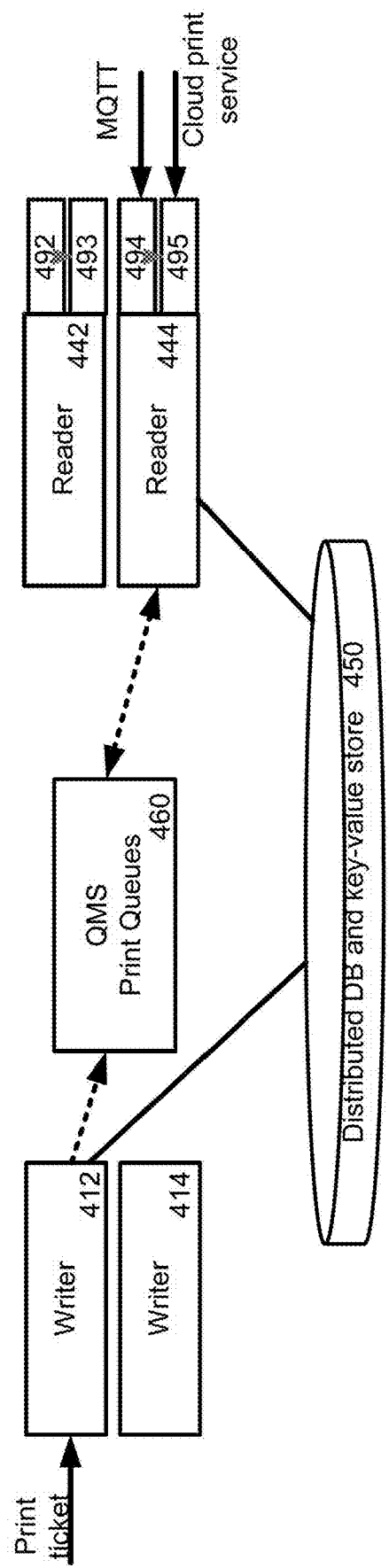
FIG. 4 is a block diagram illustrating an example implementation flow of QMS for cloud printing according to aspects of the disclosure.

FIG. 4 illustrates an example low-latency print flow according to aspects of the disclosure. The flow occurs among components including one or more writers 412, 414, one or more readers 442, 444, QMS print queues 460, and a distributed database 450. The print flow includes operations at both a writer side and a reader side, wherein the operations meet at the QMS print queues.

At a printer side of the flow, a printer connects to a reader, such as via MQTT. The reader makes a claim to QMS. The printer periodically heartbeats via the reader to QMS to maintain the claim. QMS maintains cursors of which messages have been processed for the printer. If all caught up, it does nothing. It also records that the printer is online in memory.

At a writer side, a print job is received at a system and a service generates a ticket to print and enqueues a print job message for the print job to a writer. The writer writes the print job message to the database. If successful, the writer sends a notification to QMS to let it know that a new print job message for the printer has been enqueued. The writer then returns an acknowledgement to the system that received the print job, indicating that the print job has been accepted.

According to a QMS flow, the QMS receives a notification for the print job message. It knows that the printer is connected, that it has not processed the print job message. The QMS can therefore immediately send a message to the reader to deliver the print job message. The reader reads the print job message payload from the database and sends it to the printer. A recipient processes the message, such as by printing the ticket, and acknowledges it via the reader to QMS. The QMS coordinator advances the cursor for the printer by 1. It then sees if a new print job message is present. If so, it goes back to a beginning of the QMS flow. If not the printer is caught up.

The writer 412, 414 is responsible for spooling incoming print jobs into QMS. It may look up the QMS region/UUID from a short print queue ID.

The reader 442, 444 may be responsible for handling various print protocols for operation and authentication of connected printers. Supported protocols may include, by way of example only, CloudPRNT, MQTT, or other protocols. According to some examples, each reader 442, 444 may have protocol-specific code 492-495. For example, as different printers use different encodings and protocols (MQTT/HTTP), adapters may be implemented for each one.

Cloud print protocols use separate HTTP requests to periodically discover, read and acknowledge print requests. Long-polling may include delaying a response to the request, such that if a new message is received via QMS during that delay, it may be immediately printed. The response may be delayed by, for example, 10 s, 20 s, 50 s, 100 s, or any other duration as long as the printer does not time out.

MQTT printers use long-running connections which will hold a QMS claim. Any messages received via QMS can be printed immediately. If the QMS claim is lost, the connection can be disconnected and the printer will re-connect elsewhere. MQTT printers have limited buffer sizes and can typically only handle one or a few inflight jobs at a time. If overwhelmed, they drop jobs—sometimes silently by claiming it printed successfully. MQTT brokers offer little to help avoid such situations. In contrast, the QMS queue and exclusivity semantics lets the printing service ensure that at most 1 job is inflight at any given time.

For any protocol, the in-flight print job may be stored in database 450 tables before sending an acknowledgement to QMS to prevent duplicate prints due to re-delivery caused by transient QMS or connection failures. For poll-based scattershot protocols such as the cloud print protocol (CloudPRNT), the discovery (POST), get (GET) and ack (DELETE) are separate HTTP requests and do not map directly to QMS operations. In this regard, the head of the print queue may be buffered to have it ready for the GET operation after a successful discovery. The in-flight job is deleted when acknowledged by the printer. The next discovery call will get and buffer the next job from QMS, and the cycle repeats.

Each instance holds both components and is scalable as no internal communication is needed for the print flow.

Figure 5:
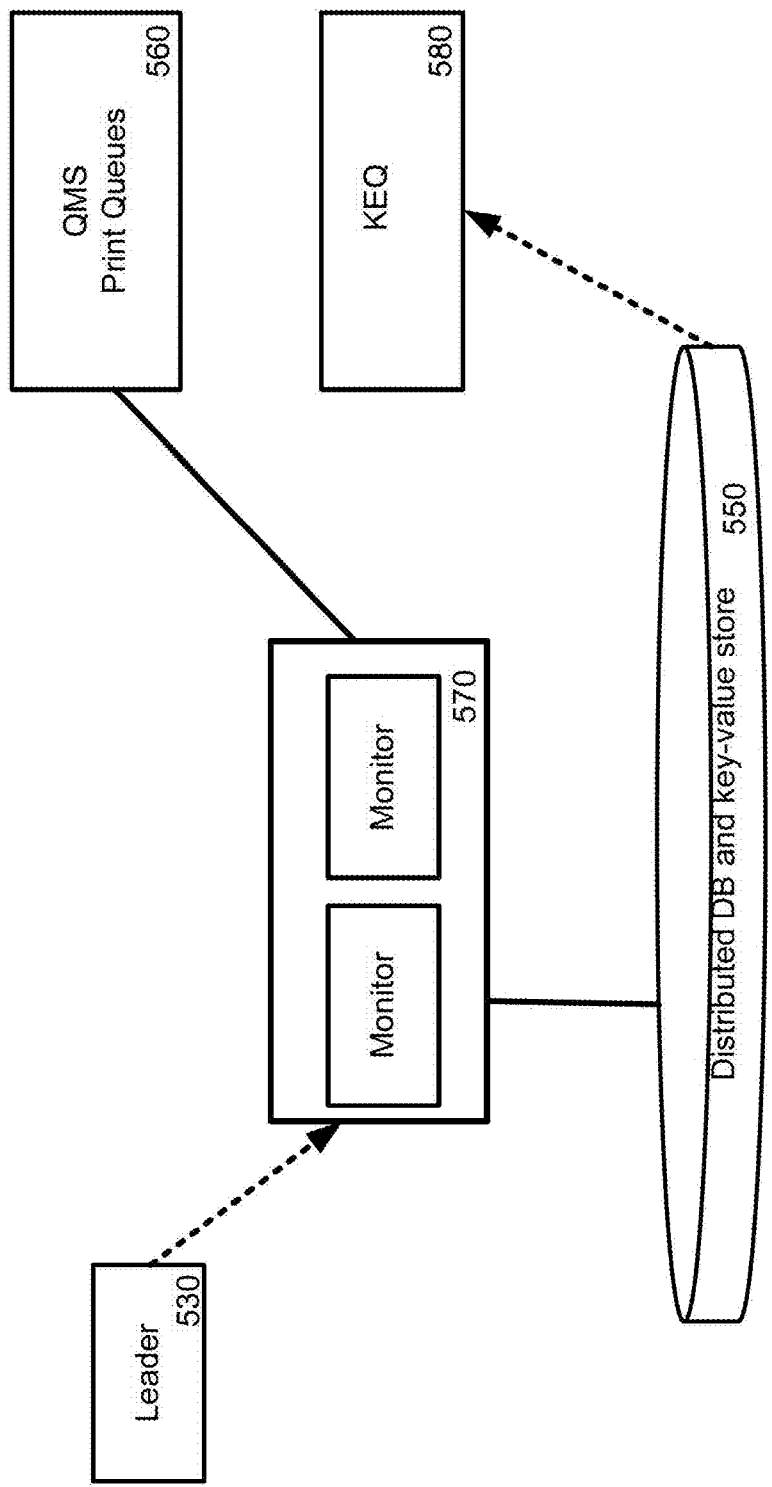
FIG. 5 is a block diagram illustrating example implementation flow of QMS for cloud printing according to aspects of the disclosure.

FIG. 5 illustrates an example printer observability flow, including a leader 530, one or more monitors 570, QMS print queues 560, and keyed event queue (KEQ) 580.

The dynamically-chosen global leader 530 is responsible for monitoring shard assignments and load balancing among workers.

Each monitor 570 may be responsible for ensuring that the status of all print queues in their given shard is correctly reflected in the database 550. It maintains in-memory print queue state and queries QMS's in-memory state for print job failures and time since last connected. It scans the database 550 periodically to discover added and removed print queues. If a print queue has not been claimed for a time interval, such as several minutes, it may be considered to be offline or malfunctioning. If a printer has been offline for longer, such as a number of days or months, it may be considered to be dead and therefore deleted. If it comes back into use, it may be considered a new printer with a new name and region/UUID. The benefit of using the QMS claim state is that it is guaranteed to expire in the presence of failures. If a printer is not connected to the printing service, its QMS address cannot remain claimed and the printing service will mark it offline. In contrast, using a standard approach for MQTT printers, for example, the node where the MQTT connection is terminated could mark the printer online or offline. However, that does not work correctly if the node crashes and the printer does not reconnect, because such logic would make the printer appear online since there is no action to make it offline. A standard way to overcome that is to periodically update a connection heartbeat in a database, but that is heavy weight and spends a lot of I/O just to maintain a steady state, even if no jobs are printed.

QMS print queues may go through a life cycle of states, such as CREATED, UPDATED, ONLINE/OFFLINE, OUT-OF-PAPER, etc, transactionally emitted to KEQ 580 by writing to the database 550. Additionally, when a job is printed, the reader similarly emits a PRINTED event. This allows print operations, which create and track print jobs, to process the print queue status as update events as opposed to periodically calling the printing service application programming interface (API) to obtain queue and job statuses.

The leader and monitors in some examples may only be needed for sharding observability and garbage collection, such that normal print operation is not impacted if the leader or monitors are down.

Figure 6:
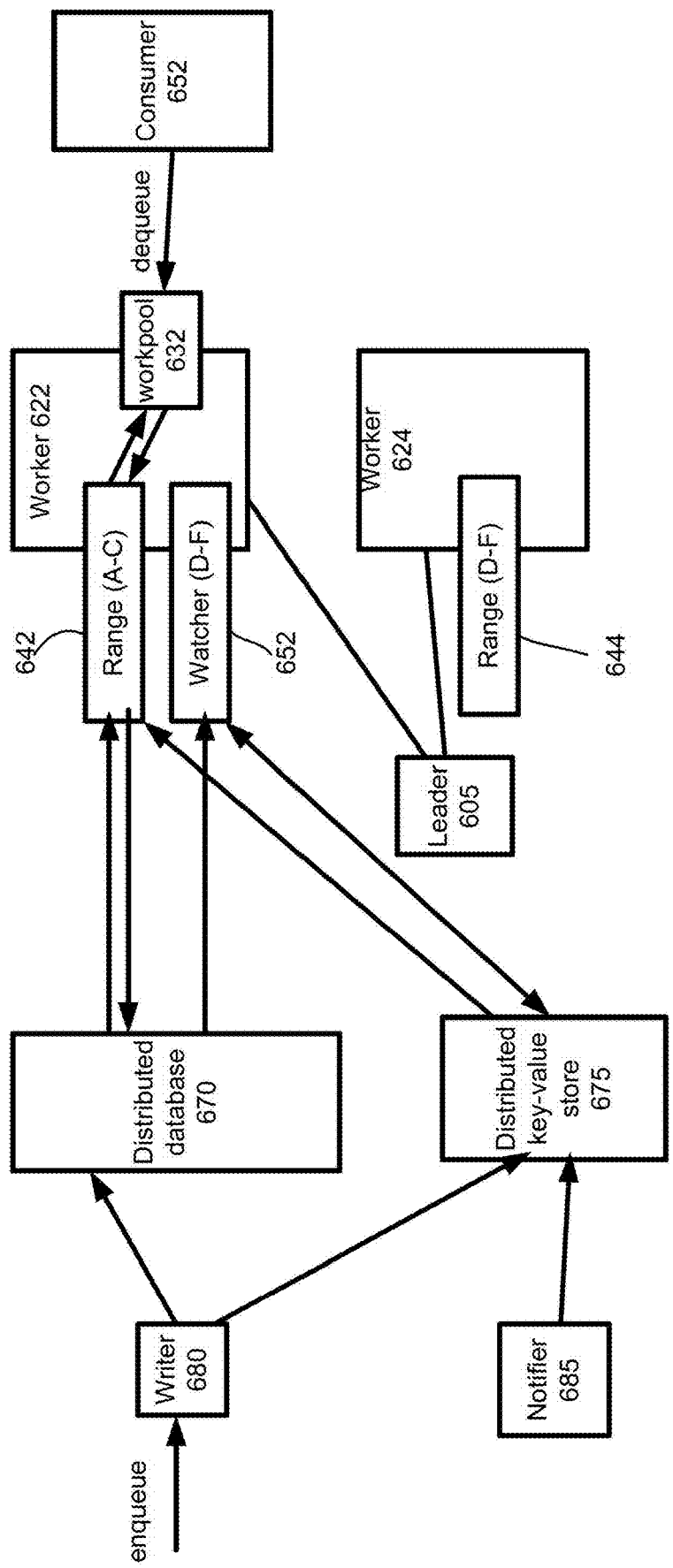
FIG. 6 is a block diagram illustrating an example architecture of a keyed event queue.

KEQ 580 is an example message broker. While KEQ 580 is described in the present example, in other examples other message brokers may be used, such as Kafka. FIG. 6 illustrates an example system for implementing KEQ. The system includes a leader 605 and a plurality of workers 622, 624, which communicate with consumers.

Leader 605 may be a dynamically-chosen global leader of workers 622, 624. The leader 605 may be, for example, a server that is elected from a number of servers, wherein the non-leader servers are the workers 622, 624. In some examples, the leader 605 may be a software module that is active on a single machine in a cluster at any given time. In some examples, the workers 622, 624 may also be software modules, wherein one or more of the workers 622, 624 may be active on the machine or node that holds the leader or on a separate machine.

The leader 605 may be responsible for shard assignments and load distribution among all workers 622, 624, and pushing any global topic/subscription information. For example, the leader 605 and workers 622, 624 may form a "control plane" that coordinates how work should be sharded or distributed. By way of example only, the leader 605 may assign shards for order IDs 0-5000 to the worker 622, and shards for order IDs 5001-10000 to worker 624. The leader 605 may use distributed database 670 for high level topic and/or subscription information.

Workers 622, 624 coordinate with the leader to renew their ownership lease. If the leader 605 crashes, a new leader takes over and collects existing assignments from workers 622, 624. If a worker or consumer crashes, the leader will re-assign the shards after its lease expires.

Each worker 622, 624 coordinates data-plane aspects and is responsible for managing consumer connections and managing the lifecycle of leader-assigned shards for both topics and subscriptions. While two workers 622, 624 are shown in FIG. 6, any number of workers may be included in the system. Moreover, the number of workers may be scaled upwards or downwards.

The workers 622, 624 may be connected to consumers 652. A consumer 652 may be an entity or service that performs actions corresponding to each event. For example, where the events correspond to a food delivery order, the consumer 652 may be a restaurant that receives the order and prepares the food, or a driver service that picks up the food from the restaurant and delivers it. According to some examples, each event may be a smaller step in an overall process of receiving a food order and delivering it. For example, each event may be any time something happened to the order such as "order placed", "ready to print", "ticket printed", "ready to cook", "cooked", "ready to pickup", etc.

A producer takes or reports some action and updates the order information and appends/emits the corresponding event to the order event queue. A consumer again reads and acknowledges, or reacts to, events. Consumers for order processing may also be producers. For example, the printing service will react to the "ready to print" event by printing a physical ticket in some kitchen where the order is supposed to be cooked. After the ticket is printed, the printing service will emit "ticket printed" event (which other services may react to). When the cook has made (some part of) the physical order, they will press a button to update the order to a "cooked" state and emit the "cooked" event.

Each consumer connection for dequeuing messages is managed by a workpool 632, which may be a set of work objects. The workpool 632 may match the lifetime of the long-lived bi-directional streaming connection, sequence messaging delivery, sub-lease messages, and manage heartbeats to the consumer. Each message is individually acknowledged and sub-leased. When a consumer 652 connects, the workpool 632 is created and the leader 605 is informed about its existence. Shard allocation may confirm to wherever consumers 652 are connected. The leader 605 may ask the worker 622 to disconnect the consumer 652 for load-balancing.

When a shard is assigned to a specific consumer under a worker-level lease, the worker creates a range 642, 644, which may be exclusively responsible for delivering messages in that shard and recording progress. The range 642, 644 may be, for example, a software component responsible for delivering messages in a shard to a specific connected consumer. When a shard is assigned to a worker for a subscription, where the consumer is a connected, a range may be created to listen for notifications and deliver messages. The range 642, 644 maintains cursors what is the tail of the queue, or latest in memory, and what has been successfully processed. The messages and cursors form a range of rows in the database. Messages that are eligible to be delivered are called "activated". The range 642, 644 will activate the next message, or a batch of messages, for a queue once it has durably recorded that the previous one has been processed.

Maintaining cursors for the tail of the queue may involve listening to notifications from distributed key value store 675 on what changed for that topic shard from that point, and an initial strong scan of a current state of the topic shard. Ranges 642, 644 try to deliver new messages as quickly as possible, but also handle slow consumers and subscriptions that are way behind. Internally, ranges 642, 644 use concurrent blocking queues to apply back pressure. According to some examples, the range 642, 644 may pause processing notifications if fully backed up.

A watcher 652 may be assigned for each topic. The watcher 652 may be a software component associated with a topic shard. It may be dynamically assigned by the leader 605, but is independent of any connected consumers and can be assigned to any worker 622, 624. The watcher 652 performs the following for each shard: remedy if messages were enqueued, but corresponding notifications were not sent; expire and delete queues that have exceeded a retention period; and clean up its own and range tracking of cursors for the deleted queues. Ranges 642, 644 may be notified that a queue has been deleted, for example, by sending a notification with −1 as the seqno. Watchers 652 durably store cursors to track that notifications have been sent.

The watcher 652 periodically scans a shard of distributed database 670. According to some example, the watcher 652 when scanning may use eventual consistent reads to avoid conflicting with updates. Based on the scan, the watch 652 may determine ground truth on what queues are added, updated, or removed.

The watcher 652 may also observe notifications from the distributed key value store 675 to avoid redundant notifications, such as if another component has already emitted the notification.

The distributed key value store 675 supports watching a single key range as a changelog instead of all notifications. Each range 642, 644 sees relevant changes only. Notifications may be emitted by "flashing" updates, such as by writing a cursor and then deleting it immediately. According to other examples, an in-memory multi-region Semi-Reliable Broadcast (SRB) service may be implemented for handling broadcast of notifications.

Writer 680 may be responsible for enqueuing incoming messages. For example, the writer 680 commits the message with the next seqno and, if successful, asynchronously broadcasts a notification via the distributed key value store 675. Concurrent writes may be serialized as a result of using distributed database transactions. The message is accepted if the commit succeeds. If the notification is not emitted for any reason, the watcher 652 may eventually discover it for delivery.

Notifier 685 allows for external writers to emit distributed key value store notifications. It may be used by remote topics after a transactional enqueue. Remote topics may differ from internal topics in how the messages/queues are written and deleted. For example, internal topics go through the writer 680. In contrast, remote topics may write directly to the distributed database 670 and then call the notifier 685 to let KEQ quickly deliver the message. KEQ may have read-only access to remote tables. Deletion of messages/queues for remote topics may be performed by the external writer instead of the watcher 652. While the writer 680 and notifier 685 are shown as separate components, they may be modules within a same computing device.

In operation, the leader 605 is elected and announces itself. All workers 622, 624 connect to the leader 605. The leader 605 assigns work to all workers 622, 624. The leader 605 tries to assign work evenly, while respecting region affinity if possible. The leader 605 may choose to assign the worker 622 some shards for that subscription. When a shard is assigned, the worker 622 creates a range 642 for the shard. The range 642 and watcher perform the message handling for their assigned shard. The range 642 starts listening for notifications for the corresponding topic shard, the notifications indicating that the queue in the distributed database 670 has changed. The range 642 then scans the cursors and queue metadata to know exactly what how many messages are in the queues in the shard and what the consumer 652 has already processed. If it is behind for any queue, the range 642 will activate the next message. For every new message, the new message is appended by calling the writer 680, which will write the message to the database 670 and update the metadata. It then sends an opportunistic "fast path" notification to let all impacted ranges 642 know that a new message is available for delivery. When the range 642 sees the notification, it can activate it immediately, assuming the consumer 652 was not behind. The range 642 thus reads the message payload from the database 670 and sends it to the consumer 652. The consumer 652 receives the message and performs whatever action necessary—sometimes nothing. It then sends an ACK in response to the message to the range 642. The range 642 receives the ACK indicating that the message was processed correctly. It updates the cursor in the database 670 to durably record progress. Once done, it will activate the next message in the queue, if any.

Returning to FIG. 5, the monitors 570 may detect print queue backlog, delay and print times. Such information may be published as metrics and used for planning, maintenance, system adjustments, etc. The sharded architecture makes it possible for a distributed printing service to report real-time gauge metrics, such as "how many printers are online right now" or "how may jobs are inflight right now".

Utilizing the cloud print service, all printers effectively become push-based via the fast targeted notification service, QMS. Delaying the poll response can be used to trick HTTP printers to long-poll slightly.

Figure 7:
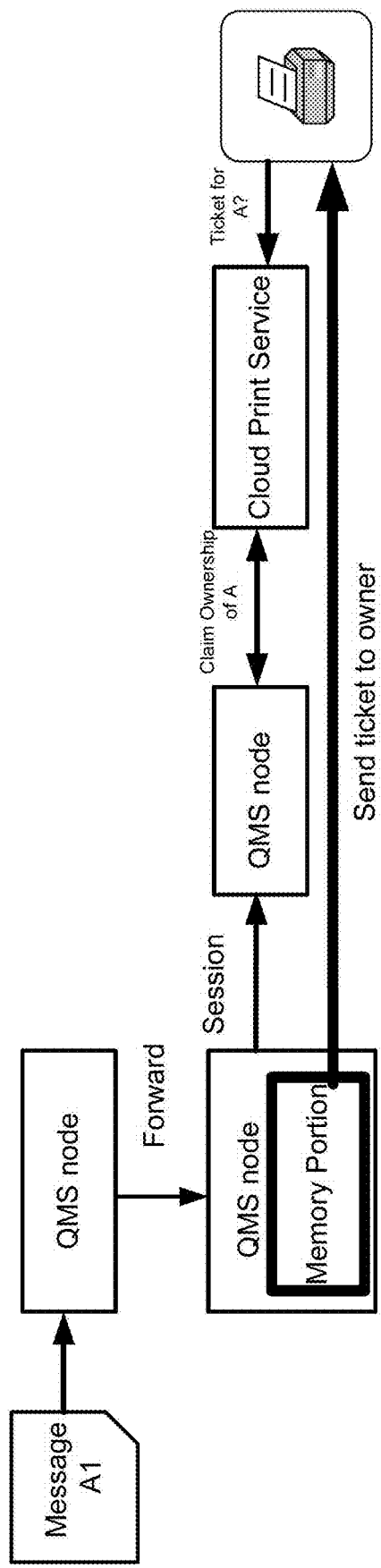
FIG. 7 is a functional block diagram of an example implementation of QMS in cloud printing according to aspects of the disclosure.

FIG. 7 illustrates another example of cloud print services utilizing QMS. Each printer has a durable memory portion on a QMS node. When a printer connects, the cloud print service claims ownership and is reliably sent messages in order. When it disconnects, the cloud print service relinquishes ownership. QMS dynamically distributes the responsibility for all the memory portion queues into shards.

Another example implementation of QMS is MQTT Proxy. The MQTT Proxy could use QMS as a command queue for each sensor. The MQTT Proxy may translate a MQTT subscription into a region/UUID both for submitting and retrieving commands and thus uses QMS as an implementation detail. For incoming sensor data, the proxy can use KEQ.

According to some examples, other connected devices may use QMS. For example, where QMS is used for printing order tickets in a kitchen that is remotely located from where the order was placed, other connected devices may include a barcode/QR scanner, light diodes, etc. Such sensors maintain long-running connections and can directly use the QMS sub-lease for exclusivity. Commands can be sent quickly and reliably. Sensor authentication may be handled by the MQTT Proxy.

Figure 8:
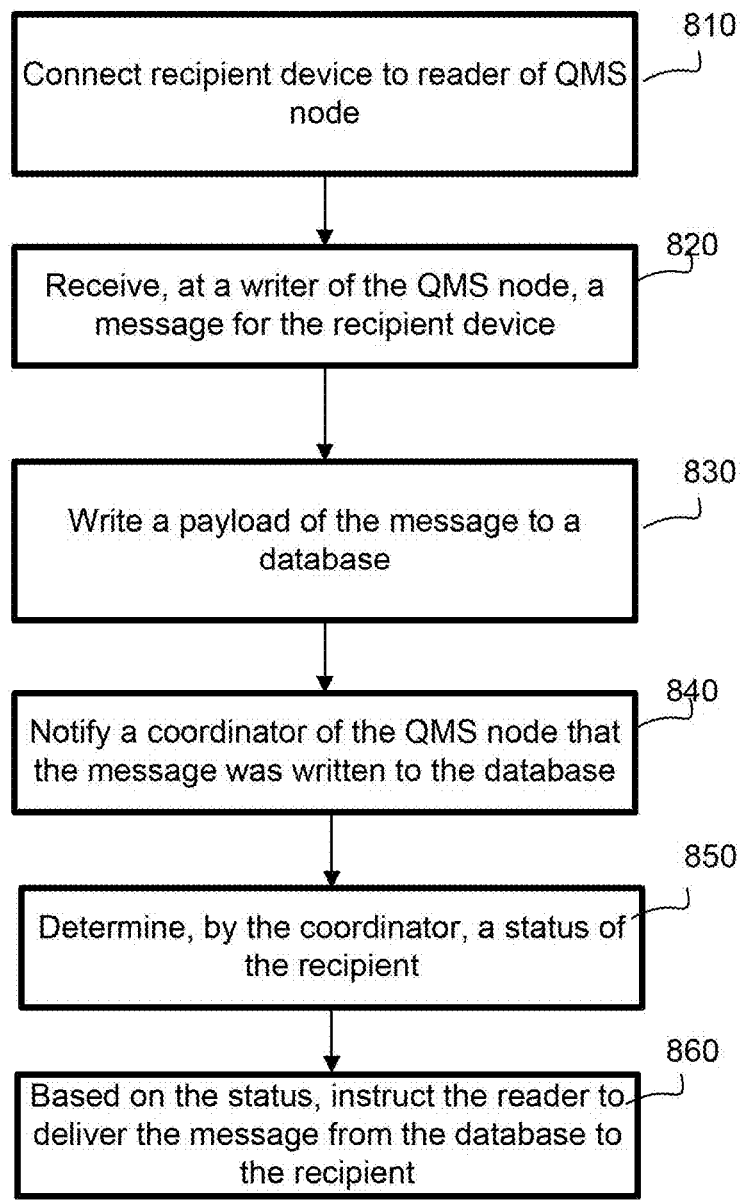
FIG. 8 is a flow diagram illustrating an example method according to aspects of the disclosure.

FIG. 8 illustrates an example method for delivering messages using QMS. The method may be performed by a QMS node. The QMS node may include one or more processors executing various instructions, threads, etc. While the method is described below in a particular order, it should be understood that the order of the steps can be modified. In some examples, multiple steps may be performed simultaneously. Further, steps may be added or omitted.

In step 810, a recipient device is connected to a reader of the QMS node. The recipient device may be any remote computing or peripheral device, such as a printer, display, speaker, etc.

In step 820, a writer of the QMS node receives a message from a sender, the message being intended for the recipient device. The message may be, for example, information to be output by the recipient, such as a print job to be printed, a message to be displayed, sounds to be output through a speaker, etc. Accordingly, the message may include a payload and header information, such as source and destination identifiers.

In step 830, a payload of the message is written to a distributed database. According to some examples, coordinators of the QMS node may each be assigned a corresponding address range of the distributed database. Each coordinator may also manage the connection for a subset of the recipient devices. Accordingly, when writing the payload to the distributed database, the writer may write to an address range that corresponds to the coordinator or recipient device.

In step 840, the writer notifies a coordinator of the QMS node that the message was written to the distributed database. For example, the writer may notify a particular coordinator that is assigned the address range where the message was written.

In block 850, the coordinator determines a status of the recipient. By way of example, the recipient device may periodically heartbeat with the coordinator, thereby providing information to the coordinator as to the recipient device status. The status may indicate whether the recipient device is connected or not, online or offline, healthy or experiencing errors, etc. The status may be stored by the coordinator and updated each time a new or different status is determined.

In block 860, the coordinator instructs the reader to deliver the message from the distributed database to the recipient based on the determined status. For example, if the recipient device is connected and ready to receive the message, the coordinator will instruct the message to be sent. However, if the coordinator determines that the recipient is offline, the coordinator may wait for the recipient device to come back online before instructing that the message be delivered. In some examples, the coordinator may ping the recipient device to trigger the recipient device to enter a ready mode where it can accept messages.

The systems and methods described above may provide for faster, more reliable messaging between a server or other computing devices and a plurality of remote recipients. By writing the messages to the database, the messages can be retrieved at any time. For example, if the recipient is not connected or is experiencing an error when the message is sent, the message is not lost but instead is stored in the database where it can be retrieved as soon as the recipient is connected and properly functioning.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
   memory; and
   one or more processors in communication with the memory, the one or more processors configured to:
   assign, by a leader, a range of addresses of a database to each of a plurality of coordinators, wherein each coordinator manages communications with a subset of one or more peripheral devices connected to the system;
   receive, by a writer, an incoming message;
   enqueue, by the writer, the message in the database; and
   notify, by the writer based on an address of the enqueued message, one of the plurality of coordinators having the range of addresses that includes the address of the enqueued message.

2. The system of claim 1, wherein the one or more processors are further configured to:
   deliver, by a reader, the enqueued message to a recipient.

3. The system of claim 2, wherein the recipient is a peripheral device.

4. The system of claim 3, wherein the peripheral device comprises at least one of a speaker, display, or printer.

5. The system of claim 2, wherein the reader is configured to:
   load a payload of the enqueued message from the database; and
   relay an acknowledgement to the one of the plurality of coordinators having the range of addresses that includes the address of the enqueued message.

6. The system of claim 1, wherein the plurality of coordinators are configured to maintain a status of each of a plurality of connected peripheral devices.

7. The system of claim 1, wherein the leader is further configured to distribute a load among the plurality of coordinators.

8. The system of claim 1, wherein the plurality of coordinators maintain queue message metadata and delivery progress of messages.

9. The system of claim 1, wherein the memory stores a shard assignment table, the shard assignment table indicating a correlation between each of the plurality of coordinators and an assigned address range.

10. The system of claim 1, wherein each of the plurality of coordinators is configured to scan queues in the assigned address range of the database to check for newly committed messages.

11. A method, comprising:
- connecting a recipient device to a reader of a queued message service (QMS) node;
- receiving, at a writer of the QMS node, a message for the recipient device;
- writing, by the writer of the QMS node, a payload of the message to a database;
- notifying, by the writer, a coordinator of the QMS node that the message was written to the database; and
- based on a status of the recipient device, instructing, by the coordinator, the reader to deliver the message from the database to the recipient device.

12. The method of claim 11, wherein the recipient device is a printer and the message is a print job.

13. The method of claim 11, further comprising relaying, by the reader, an acknowledgement to the coordinator.

14. The method of claim 11, further comprising:
- determining, by the coordinator, a status of the recipient device based on a heartbeat from the recipient device; and
- maintaining, by the coordinator, the status of the recipient device.

15. The method of claim 11, further comprising maintaining, by the coordinator, queue message metadata and delivery progress of messages.

16. The method of claim 11, further comprising storing a shard assignment table, the shard assignment table indicating a correlation between the coordinator and an assigned address range in the database.

17. The method of claim 16, further comprising scanning, by the coordinator, queues in the assigned address range of the database to check for newly committed messages.

18. A non-transitory computer-readable medium storing instructions executable by one or more processors for performing a method, comprising:
- connecting a recipient device to a reader of a queued message service (QMS) node;
- receiving, at a writer of the QMS node, a message for the recipient device;
- writing, by the writer of the QMS node, a payload of the message to a database;
- notifying, by the writer, a coordinator of the QMS node that the message was written to the database; and
- based on a status of the recipient device, instructing, by the coordinator, the reader to deliver the message from the database to the recipient device.

\* \* \* \* \*